United States Patent Office 3,597,388
Patented Aug. 3, 1971

3,597,388
POLYCHLOROPRENE FOR SURFACE COATING COMPOSITIONS
Klaus Hoehne, Leverkusen, and Georg Freudenberg, Opladen, Germany, assignors to Farbenfabriken Bayer Aktiengesellschaft, Leverkusen, Germany
No Drawing. Continuation-in-part of application Ser. No. 486,216, Sept. 9, 1965. This application Nov. 3, 1967, Ser. No. 680,345
Int. Cl. C08f 45/04; C08k 1/06
U.S. Cl. 260—41R                                           4 Claims

ABSTRACT OF THE DISCLOSURE

Masticated storage stable compositions comprising a polychloroprene of medium crystallization tendency having specified hardness and Mooney viscosity, a polychloroprene of strong crystallization tendency having specified hardness and Mooney viscosity, magnesium oxide and zinc oxide, process for preparing the same and paint and surface coating, including the same.

CROSS REFERENCE TO RELATED APPLICATION

This application is a continuation-in-part of application Ser. No. 486,216 filed Sept. 9, 1965, and now abandoned.

This invention relates to a process for the preparation of a special polychloroprene mixture suitable for use as binders for paints and surface coating compositions.

It has been known for a long time that paints can be manufactured with polychloroprene as binder. A special advantage of this is that for example containers can be provided with an inner rubberised coating applied with a brush where hitherto it was necessary to use sheets of polychloroprene mixtures which had to be glued to the surface and then cured by the heating.

The previously known paints based on polychloroprene have been cured in the cold with a mixture of metal oxides and an accelerator mixture consisting of tetramethylthiuramic disulphide and/or N-pentamethylene-ammonium-pentamethylene-dithiocarbamate and/or butyraldehyde-butylamine and sometimes also with isocyanate. For this it is necessary to masticate the polychloroprene with rollers and incorporate pigments or fillers.

Mastication is necessary in order that the polychloroprene may be dissolved to form a solution of relatively low viscosity. Unmasticised polychloroprene forms solutions having too high a viscosity or containing too little solid material for painting purposes. Pigmentation must be carried out on the roller immediately after mastication.

The sheet obtained by this method must immediately be dissolved in a suitable solvent because otherwise the sheet becomes strengthened to such an extent, even if stored only for a short time (1 to 2 hours) and in the dark, that it will only dissolve into a highly viscous solution if at all.

This process thus has numerous disadvantages: Mastications having too high a viscosity or containing too little solid material for painting purposes. Pigmentation must be carried out on the roller immediately after mastication.

The pigmentation which immediately follows also requires rollers. A masticated material stable on storage, on the other hand, can easily be pigmented in solution on a three-roller mill or in a sand mill as customarily used in the paint industry.

If, however, the polychloroprene is to be masticated by a rubber processor and is to be dissolved and pigmented on a three-roller mill by the paint manufacturer, then the time interval for the transport of the masticated polychloroprene is too long. It is by then usually not possible to bring the masticated polychloroprene into solution.

It is therefore virtually impossible for the unmasticated polychloroprene to be worked up in the lacquer and paint industry, and masticated products are not sufficiently stable in storage for the manufacture of paints. For this reason, polychloroprene has not hitherto become established in the lacquer and paint industry in spite of the fact that it is well suited for the production of coating compositions.

There was therefore a demand for a polychloroprene material which could be dissolved in suitable solvents to form a solution of sufficiently low viscosity for the production of paints and which could be combined with suitable fillers and pigments on three-roller mills or sand mills or similar trituration assemblies. Such a material would have the advantage that the polychlorprene manufactured at any given time could be worked up immediately at any time thereafter and in any place desired to produce paints without having first to undergo mastication.

It has now been found that a masticated polychloroprene material which is stable in storage and suitable for the production of paints is obtained by mixing a chloroprene homopolymer having a medium tendency to crystallisation, a Defo hardness at 80° C. of about 250 and a Mooney viscosity of 30 to 45 with a chloroprene homopolymer having a strong tendency to crystallisation, a Defo hardness at 80° C. of about 900 and a Mooney viscosity of 75 to 85, adding to this mixture 1 to 10% by weight of magnesium oxide based on the weight of the polychloroprene mixture and 1 to 10% by weight of zinc oxide based on the weight of the polychloroprene mixture, masticating this mixture with cooling, drawing it out to form a uniform sheet, powdering it with talcum and granulating it. The polychloroprene of medium crystallisation tendency and the polychloroprene of strong crystallisation tendency may be employed in the ratio of 1:3 to 3:1 by weight but preferably equal parts by weight are used. The quantity of magnesium oxide and of zinc oxide is preferably in the region of 4 to 5% by weight based on the chloroprene mixture.

Mastication in the context of this invention means subjecting the material to a shearing force. This force must be sufficient to tear the individual molecules out of their molecular association without disrupting the individual molecule. Mastication may be effected in various ways. The most common is to pass the materials between two rollers which are turned at different speeds and which are only a small distance apart. The difference in speed is usually between 10 and 40%. Another method is to extrude the material from a worm-extruder which is equipped with a special kneading device. In this invention it is essential to control the temperature in the mastication process, which usually tends to increase due to the mechanical stress exerted. The temperature must not rise above 90° C. and should preferably not rise above 50° C. To insure these low temperatures external cooling is necessary.

For producing the polychloroprene used in this invention reference is made to Houben-Weyl "Methoden der organischen Chemie," Vol. 14/1, published 1961 by Georg Thieme, Stuttgart, pages 733 to 752, especially pages 736 to 737.

The material obtained by this process remains soluble with unchanged viscosity for at least one year and can therefore be worked up into paints with reproducible properties. The material should preferably be stored at room temperature and as far as possible with exclusion of light.

The Mooney viscosities indicated above were measured according to ASTM ML 4 at 100° C.

In the present invention, a chloroprene homopolymer of medium crystallisation tendency is understood to mean a material which has been obtained by polymerisation of chloroprene at temperatures of about 40° C. and the Shore hardness of which at −5° C. rises by about 3 to 7 units in the course of one hour. A chloroprene homopolymer of strong crystallisation tendency is understood to mean a chloroprene polymer which has been prepared at about 12 to 14° C. and the Shore hardness of which at +20° C. rises by about 70 to 100 units in the course of 24 hours.

The details of the mastication process are as follows:

The polychloroprene is placed on the roller together with 1 to 10%, preferably 4% of magnesium oxide and the components are mixed with the rollers at an increased distance apart until the mixture is homogeneous. During this process, intensive cooling must be carefully adhered to because the material must not assume temperatures higher than 50 to 90° C. and preferably 50° C. The mixture is then passed 2 to 10 times, preferably 5 to 7 times through the nip of the rollers with the rollers at their smallest distance apart (1 mm.) and a friction of 1:1.1 to 1.3. The more often the sheet is passed through the roller the lower will be the viscosity of the solution obtained from this product but the higher will be the viscosity of the solution prepared from the stored product. The sheet is then mixed with 1 to 10%, preferably 5% of zinc oxide with the rollers at an increased distance apart until the product is homogeneous, a temperature limit of 50° C. being observed during this process.

Another precedure which ensures greater constancy of viscosity is as follows:

All the magnesium oxide required for the whole mixture is added to the strongly crystallising polychloroprene, the temperature limit being again observed, until the mixture is homogeneous and this mixture is then passed 6 to 10 times through the nip of the rollers, with the rollers at their closest distance apart (1 mm.). With the rollers at a greater distance apart, the polychloroprene of medium crystallisation tendency is then added and the mixture then passed twice through the nip of the rollers with the rollers again at their closest distance apart (1 mm.). Finally, the zinc oxide is added and the material is mixed with the rollers at their greater distance apart until the mixture is homogeneous, the temperature limit again being observed.

Both processes yield a polychloroprene material which when dissolved in toluene to form a 15% solution has viscosities of 400 to 600 cp. measured in a Höppler viscosimeter at 20° C. The increase in viscosity of the solution after storage for one year is insignificant. If the solid material is stored in the dark and at a temperature of not more than room temperature, the viscosity of a 15% solution of this material in toluene rises to about 500 to 700 cp.

The mastication process can be modified by using magnesium oxide alone or with other degrading agents, e.g. with a mixture of dixylyl disulphides or di-ortho-tolyl guanidine. However, with this method, the same stability of viscosity over a prolonged period is not obtained as with the method described above.

A polychloroprene pretreated in this manner is particularly suitable for the production of paints. For this purpose it may be dissolved in aromatic compounds, esters or ketones, and to this solution may be added age resistors such as phenyl-$\alpha$-naphthylamine or a mixture of aralkylated phenols or a mixture of alkylated and aralkylated phenols and inert fillers or pigments, particularly carbon black. This mixture is then triturated on a roller mill, sand mill or dissolver. The resulting material is mixed with a solution of a polyfunctional isocyanate immediately before it is applied. It can be applied by any of the usual methods employed for paints or other brush-on materials.

The coating compositions prepared with the polychloroprene according to the invention have various advantages over the coating compositions based on polychloroprene hitherto used or described. They have better pigment uptake, improved film gloss, more rapid hardening after application, no clammy surfaces, and successive coats can be applied at short intervals (1 to 2 hours). The pot life is several days.

The materials are preferably applied where high resistance to chemicals, high elasticity and high abrasion resistance of the coating are required. Thus, for example, these materials are eminently suitable for protecting the insides of containers filled with corrosive liquids, for painting the insides of drying chambers which have high atmospheric moisture and high air temperature, for painting the parts of ships below the water line, wharfs, buoys and the like and for protecting the underneath surfaces of vehicles.

Hitherto it was known to mix different polychloroprenes and to use magnesium oxide and zinc oxide as additives. This is apparent e.g. from "The Neoprenes" by Murray et al., published by Du Pont, 1963, pages 77 to 82. The polychloroprenes mentioned in this context are neoprene GN and neoprene W which are used admixed to improve the final cured product. Neoprene GN contains thiuram disulphide and copolymerised sulfur and thus constitutes a copolymer which is easily cross-linked or cured and degraded by mastication. Neoprene W apparently does not contain sulfur and thiuram disulphide. A mixture of both is unsuitable for the purpose of this invention as no degradation is desired. Neoprene GN is not a polychloroprene in the sense of this invention as it constitutes a copolymer.

Further, mixtures of polychloroprenes are taught in U.S. Pats. 3,042,652 and 3,147,318. These are mixtures of an insoluble polychloroprene (i.e. a copolymer) and a soluble polychloroprene. Clearly these mixtures are unsuitable in the present invention because of their insolubility.

Polychloroprenes used in this invention are homopolymers of chloroprene which are soluble in certain organic solvents and differ only in their crystallisation tendency.

The following examples are given for the preparation of the polychloroprene mixture described above:

EXAMPLE 1

20 kg. of polychloroprene of medium crystallisation tendency having a Mooney viscosity of 41 and a Defo hardness of about 250 and 20 kg. of polychloroprene of strong crystallisation tendency having a Mooney viscosity of 82 and a Defo hardness of about 900 are placed on a rubber roller which has a width of 1000 mm., a diameter of 500 mm., a friction between the rollers of 1:1.2 and a speed of rotation of 12.9/10.8 revs./min. and is cooled on the inside with water. The distance between the rollers is so chosen that the total of 40 kg. of material are rolled out to form a continuous sheet which forms a constantly rotating bulge beyond the nip of the rollers. 1600 g. of magnesium oxide are then sprayed on to this bulge and the material rolled until the magnesium oxide has been incorporated. The sheet is then cut open, pulled as a whole through the nip and again placed on the roller. This process is repeated (5 to 10 times) until the magnesium oxide has been homogeneously incorporated. The nip between the rollers is then adjusted to its smallest width (1 mm.) and the material pulled six times through the nip. Then, with the rollers placed further apart, 2000 g. of zinc oxide are added in the same way as described for magnesium oxide. During no phase of the process does the temperature of the product rise above 70° C. The material is then rolled out on the cooled calender, powdered with talcum and granulated on the granulating machine. 8 days after mastication, the viscosity of this material when dissolved in toluene to form a 15% solution is 400 cp. measured in a Höppler viscosimeter at 20° C. After 250 days storage in the dark at room temperature, the viscosity of the 15% solution is 480 cp. measured in a Höppler viscosimeter at 20° C.

COMPARISON EXAMPLES (A) 500 g. of polychloroprene of medium crystallisation tendency having a Mooney viscosity of 41 and a Defo hardness of about 250, 500 g. of a polychloroprene of strong crystallisation tendency having a Mooney viscosity of 82 and a Defo hardness of about 900, 40 g. of magnesium oxide and 50 g. of zinc oxide were mixed mechanically. From this mixture a 15% solution in toluene was prepared which had a viscosity of 1200 cp. measured in a Höppler viscosimeter at 20° C.

(B) Example 1 was repeated leaving off the polychloroprene of medium crystallisation tendency and using half the amounts of zinc oxide and magnesium oxide. The viscosities according to the method of Example 1 were found to be as follows:

| | Cp. |
|---|---|
| Immediately after mastication | 1300 |
| After 14 days storing in the dark | 1790 |
| After storing for 100 days in the dark | 2000 |

(C) Example 1 was repeated leaving off the polychloroprene of strong crystallisation tendency and using half the amount of zinc oxide and magnesium oxide. The viscosities according to the method of Example 1 were found to be as follows:

| | Cp. |
|---|---|
| Immediately after mastication | 520 |
| After 14 days storing in the dark | 1000 |
| After storing for 100 days in the dark | 1200 |

As a solution having a viscosity of more than 500 cp. as measured according to the defined method is unsuitable as a coating agent, the foregoing comparison examples show that only the solution obtained in Example 1 is suitable for this purpose.

EXAMPLE 2

20 kg. of polychloroprene of medium crystallisation tendency and Mooney viscosity 43 and Defo hardness about 250, and 20 kg. of polychloroprene of strong crystallisation tendency, Mooney viscosity 79 and Defo hardness about 900 are placed on a rubber roller of width 1100 mm., diameter 400 mm. and friction 1:1.33 and speed of rotation 20.0/15.0 revs./min. After incorporation of the magnesium oxide as described in Example 1, the material obtained is passed four times through the nip of the rollers at their closest distance apart (1 mm). Zinc oxide is then incorporated as described in Example 1.

The temperature of the product does not rise above 50° C. during any phase of the process. 8 days after mastication the viscosity of this material dissolved as a 15% solution in toluene is 300 cp. measured in a Höppler viscosimeter at 20° C. After 350 days storage in the dark at room temperature, the viscosity of 15% solution in toluene is 390 cp. measured in a Höppler viscosimeter at 20° C.

EXAMPLE 3

20 kg. of polychloroprene of medium crystallisation tendency and Mooney viscosity 79 and Defo hardness about 250 are placed on a rubber roller as described in Examples 1 and 2, rolled out to a continuous sheet, and 1600 g. of magnesium oxide are then incorporated until the mixture is homogeneous. The resulting sheet is passed 6 times through the nip of the rollers at their closest distance apart (1 mm.). 20 kg. of polychloroprene of strong crystallisation tendency, Mooney viscosity 43 and Defo hardness about 900 are then added to this with the rollers at a greater distance apart, and the whole sheet is then passed twice through the nip of the rollers at their closest distance apart (1 mm.). Lastly, as described in Examples 1 and 2, zinc oxide is added until homogeneously distributed. The temperature of the product does not rise above 60° C. during any stage of the process. The product is rolled out on the cooled roller, powdered with talcum and granulated. 8 days after mastication, the viscosity of this material dissolved as a 15% solution in toluene is 290 cp. measured in a Höppler viscosimeter at 20° C. After 300 days storage in the dark at room temperature, the viscosity of the 15% solution in toluene is 390 cp. measured in a Höppler viscosimeter at 20° C.

The preparation of the coating composition with the use of the polychloroprene mixture prepared according to the invention is carried out according to the following recipe:

| | Parts by weight |
|---|---|
| Polychloroprene mixture | 100 |
| Age resistor | 2.5 |
| Active carbon black | 100–200 |
| Solvent | 300 |
| Polyfunctional isocyanate | 25 |

What is claimed is:
1. Masticated storage stable polychloroprene material comprising
(a) a polychloroprene homopolymer of medium crystallisation tendency having a Defo hardness at 80° C. of about 250 and a Mooney viscosity of about 30 to 45,
(b) a polychloroprene homopolymer of strong crystallisation tendency, having a Defo hardness at 80° C. of about 900 and a Mooney viscosity of about 75 to 85,
(c) magnesium oxide and
(d) zinc oxide, the ratio by weight of (a) to (b) being about 1:3 to 3:1.

2. Masticated storage stable polychloroprene material comprising
(a) a polychloroprene homopolymer of medium crystallisation tendency having a Defo hardness at 80° C. of about 250 and a Mooney viscosity of about 30 to 45,
(b) a polychloroprene homopolymer of strong crystallisation tendency, having a Defo hardness at 80° C. of about 900 and a Mooney viscosity of about 75 to 85 in a ratio by weight of about 1:3 to 3:1,
(c) 1 to 10% by weight based on the weight of the total polychloroprene of magnesium oxide and
(d) 1 to 10% by weight based on the weight of the total polychloroprene of zinc oxide.

3. Process for the preparation of a masticated polychloroprene material which is stable in storage and suitable to be used as a coating composition, characterised in that a polychloroprene homopolymer of medium crystallisation tendency, Defo hardness at 80° C. about 250 and Mooney viscosity 30 to 45 and a polychloroprene homopolymer of strong crystallisation tendency, Defo hardness at 80° C. of about 900 and Mooney viscosity 75 to 85 are mixed, 1 to 10% by weight of magnesium oxide based on the weight of the polychloroprene mixture and 1 to 10% by weight of zinc oxide based on the weight of the polychloroprene mixture are added, this mixture is masticated with cooling, drawn out into a uniform sheet, powdered with talcum and granulated.

4. Polychloroprene painting material comprising
(A) a storage stable polychloroprene material comprising (a) a polychloroprene homopolymer of medium crystallisation tendency having a Defo hardness at 80° C. of about 250 and a Mooney viscosity of about 30 to 45,
(b) a polychloroprene homopolymer of strong crystallisation tendency, having a Defo hardness at 80° C. of about 900 and a Mooney viscosity of about 75 to 85 in a ratio by weight of about 1:3 to 3:1,
(c) 1 to 10% by weight based on the weight of the total polychloroprene of magnesium oxide and
(d) 1 to 10% by weight based on the weight of the total polychloroprene of zinc oxide and (B) a polyfunctional polyisocyanate.

References Cited
UNITED STATES PATENTS

| | | | |
|---|---|---|---|
| 3,042,652 | 7/1962 | Pariser et al. | 260—890 |
| 3,147,318 | 9/1964 | Jungk et al. | 260—890 |

OTHER REFERENCES

"The Neoprenes," Murray et al., Du Pont Publication, 1963, pp. 77–82 relied on.

MORRIS LIEBMAN, Primary Examiner

S. L. FOX, Assistant Examiner

U.S. Cl. X.R.

264—140